Nov. 16, 1937.   J. L. WOODBRIDGE   2,099,640
CHARGING CONTROL SYSTEM
Filed April 18, 1936
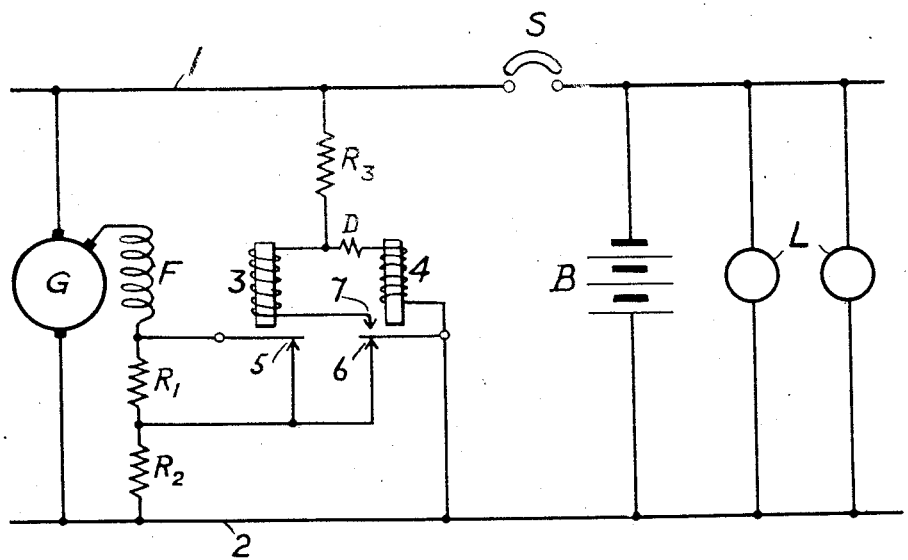
INVENTOR
Joseph Lester Woodbridge Patented Nov. 16, 1937

2,099,640

UNITED STATES PATENT OFFICE 2,099,640

CHARGING-CONTROL SYSTEM

Joseph Lester Woodbridge, Philadelphia, Pa., assignor to The Electric Storage Battery Company, Philadelphia, Pa., a corporation of New Jersey Application April 18, 1936, Serial No. 75,073

6 Claims. (Cl. 171—314)

This invention relates to means for controlling the charge of a storage battery and is especially adapted for use in an electrical system such as is employed on an automobile for starting an internal combustion engine and for supplying electric current for lights, ignition and other electrical devices.

In such a system, it is desirable to keep the battery at all times as fully charged as possible, to recharge it as rapidly as permissible after a discharge, and to cause the generator to carry the load due to the lights and other electrical devices whenever it is capable of doing so. In order to utilize the capacity of the generator to the fullest possible extent, it is desirable to adjust its output to its maximum capacity so long as this does not cause injuriously high charging current into the battery. With a fully charged battery and no load connected except that for ignition, the generator output must be reduced to a comparatively low value to avoid injurious charging. There are many operating conditions however such, for example, as running with part of the load connected or with light load and a partly discharged battery, under which the maximum output of the generator would cause too high a charging rate but the minimum adjustment would either not charge at all or charge at a rate considerably below that which the battery could safely take, thus failing to utilize the capacity of the generator as fully as possible. To meet these last mentioned operating conditions, it is desirable to provide a third adjustment of the generator output intermediate between the maximum and the minimum.

In order to effect the adjustment of generator output, it has been proposed to provide a relay or similar device responsive to the battery voltage, so designed and connected as to reduce the generator output when the battery voltage reaches a certain predetermined value. With such an arrangement in order fully to utilize the available generator capacity, it is desirable to restore the generator output whenever the battery voltage has dropped to a value not far below that at which the generator output was reduced. This involves a relay expensive to build and difficult to adjust. Furthermore, to provide a three-step adjustment, two such relays must be used, introducing additional difficulty to insure that they will operate in the desired order of sequence. This would ordinarily require that they be adjusted to operate at different battery voltages, whereas, for ideal conditions, they should operate at the same voltage. It is further desirable, for maximum economy in mass production, that the two relays should be identical in design.

The principal object of my invention is to provide for accomplishing the desired results and avoid the difficulties enumerated above.

Other objects will appear by reference to the following description taken in connection with the accompanying drawing showing diagrammatically one embodiment of the invention.

In the drawing, G is a third brush generator connected to the circuit 1—2 and to the battery B and load L by means of the automatic switch S which may be of any well known design. In series with the field F of the generator are shown two resistors $R_1$ and $R_2$. $R_1$ is short circuited by the contact 5 of the relay 3 and $R_2$ is short circuited by the contact 6 of the relay 4. These two contacts are closed so long as the excitation of the coils 3 and 4 is below a certain minimum. These coils are connected across the circuit 1—2 through a common resistor $R_3$, and the upper contact 7 of relay 4 is interposed in the circuit of the exciting coil of relay 3 so that this coil is not connected until the armature of relay 4 is lifted. A resistor D is connected between coil 4 and the junction point between $R_3$ and coil 3.

The design of the apparatus is such that, when the voltage of the generator G rises to a certain predetermined value, for example eight volts, the excitation of the relay 4 is sufficient to open the contact at 6 and close the contact at 7, thus introducing resistor $R_2$ in series with the field F and reducing the generator output from the maximum to an intermediate value.

The additional drop introduced into resistor $R_3$ by the increase of current passing through relay 3 when the contact 7 is closed will adjust the excitation of relay 4 so that the armature of this relay will drop when the voltage has fallen to some slightly lower value, for example six and one-half volts. This value should be lower than the value to which the voltage of the generator will be reduced when the resistor $R_2$ is cut in.

After the resistor $R_2$ has been cut in by the opening of the contact at 6, if the voltage continues to rise due to continued charge of the battery, the relay 3 will finally operate at some predetermined voltage, eight volts for example, and cut in resistor $R_1$, thus reducing the output of the generator to the minimum value.

If the generator voltage is now reduced by throwing on additional load or by reduction of speed, the relay 4 will drop out, thus opening the excitation circuit of relay 3, and the original conditions will be restored.

The resistor R3 has another function in the operation of this device. Before the automatic switch S closes, the generator voltage is liable to rise to a sufficient value to operate relay 4. By reason of the added current in resistor R3 due to closing the contact at 7, relay 4 will be adjusted to drop out again due to the reduction in voltage caused by the load thrown on the generator when the automatic switch closes as well as the reduction due to the cutting in of resistor R2 into the field circuit.

The two relays 3 and 4 may be identical in design, including their exciting coils, if resistor D is so designed that, with a given voltage across the circuit 1—2, the current passing through coil 4 when the contact at 7 is open will be the same as the current in coil 3 when the contact at 7 is closed.

It will be obvious to those skilled in the art that modifications may be made in details of construction and arrangement without departing from the spirit of the invention which is not limited as to such matters or otherwise than as the prior art and the appended claims may require.

I claim:

1. In combination, a storage battery and its load circuit, a generator provided with means for controlling its output selectively at any one of three values, a voltage-responsive means normally inoperative for reducing the output from the intermediate value to the lowest value, and other voltage-responsive means for reducing the output from the highest to the intermediate value and simultaneously putting the first-mentioned means into operative condition.

2. In combination, a third-brush generator with its field coil, two resistors connected in series with the field coil, two voltage-responsive relays, each having an exciting coil and an armature and contacts adapted to short circuit one of the resistors when the armature is released, and a circuit including a resistor for connecting the exciting coil of one of said relays across the generator terminals, said relay having contacts adapted, when its armature is attracted, to connect the exciting coil of the second relay in parallel with that of the first.

3. The combination, with a generator having means including an adjustable field circuit for controlling its output at any one of three values and a storage battery and a load circuit of said generator and said battery, of, a pair of identical relays each having an exciting coil and an armature and contacts, a resistance, a circuit connecting the exciting coil of one of said relays and said resistance in series across said generator, a circuit interconnected with said field circuit and controlled by contacts of said one of said relays controlling the output of said generator at the highest value and at the intermediate value, a circuit connecting the exciting coil of the other of said relays and contacts of said one of said relays across said generator whereby sufficient excitation of the coil of said one of said relays closes the circuit connecting the coil of the other of said relays across said generator, and a circuit interconnected with said field circuit and controlled by the contacts of said other of said relays and controlling the output of said generator at the intermediate value and at the lowest value.

4. In combination, a generator with its field coil, a resistor connected in series with the field coil, two voltage-responsive relays, each having an exciting coil and an armature and contacts adapted to short circuit a portion of the resistor when the armature is released, and a circuit including a second resistor connecting the exciting coil of one of said relays across the generator terminals, said relay having contacts adapted when its armature is attracted to connect the exciting coil of the second relay in parallel with that of the first.

5. In combination, a generator and its field coil, adjustable resistance for the field coil, two identical voltage-responsive relays with their exciting coils and armatures whereof the first has its exciting coil connected in a circuit including a resistor across the generator terminals and has contacts controlled by its armature for increasing the field resistance at a predetermined generator voltage and simultaneously connecting the exciting coil of the second relay in parallel with that of the first through a second resistor, and contacts controlled by the armature of the second relay for further increasing the field resistance at a predetermined generator voltage.

6. In combination, a generator and its field coil, adjustable resistance for the field coil, two voltage-responsive relays with their exciting coils, each of said exciting coils being connected in a circuit across the generator terminals, and whereof the first relay is provided with two sets of contacts controlled by its armature, one set normally connected to short-circuit a portion of the field resistance and the other set connected in the circuit of the exciting coil of the second relay and normally open, the first set adapted to be opened and the second set to be closed by the armature when attracted, and whereof the second relay is provided with contacts controlled by its armature and normally connected to short-circuit another portion of the field resistance and adapted to be opened by the armature when attracted.

JOSEPH LESTER WOODBRIDGE.